United States Patent Office 3,415,746
Patented Dec. 10, 1968

3,415,746
METHOD FOR EXTRACTING SALT
FROM SEA WATER
Ralph W. Buetow, Madison, Wis., assignor of one-half to Keith Schoff
No Drawing. Filed Feb. 23, 1965, Ser. No. 434,686
6 Claims. (Cl. 210—59)

ABSTRACT OF THE DISCLOSURE

A solvent extraction method for reducing saline content of aqueous solution using solvents of cyclic structure and comprising oxygen ring members.

---

This invention relates to a method for extracting salt from sea water or brine, and more particularly relates to a method for precipitatively extracting saline solutions by use of organic solvents comprising oxa-cyclic compounds.

Precipitative extraction of a solution is performed by adding a liquid solvent or solid misible in whole or in part with solution components to cause the solution to split into two phases with the distribution of the solution components between phases being such as to effect component separation. In the herein described process dissolved mineral salts are less soluble in an added-solvent rich phase than in a complementary phase. After separation of the phases and recovery of added solvent two saline solutions remain, one having a lower salt concentration than the original solution. The extraction method of this invention is suitable for pre-treating saline feed water streams, for example, in marine boiler or water purification equipment use.

It is an object of this invention to reduce salt concentration in sea water.

It is another object of this invention to precipitatively extract brine or salt crystals from saline solution.

It is another object of this invention to extract saline solutions utilizing relatively non-toxic, non-corrosive, recoverable solvent.

Other objects of the invention will become apparent from the following detailed description in which it is intended to illustrate the applicability of the invention without thereby limiting its scope to less than that of all equivalents which will become apparent to one skilled in the art.

Precipitative extraction of sea water can more economically be accomplished per unit weight of salt removed as brine than can salt removal by other processes, i.e., distillation, freeze separation, or dialytic separation, and therefore may constitute a desirable pre-treatment step for salt water conversion processes. It is necessary or desirable that added solvent be removed or recovered substantially totally from treated water, that it be substantially non-toxic to insure against adverse effects from use especially if product water is to be used for human consumption, and that product water not be rendered corrosive or harmful for industrial or agricultural use.

This invention may utilize added solvents comprising ethers, and particularly oxa-cyclic compounds such as dioxanes, dioxolane, tetraoxane (alternately known as tetraoxcane), etc., but solvents which do not combine low-toxicity, high stability under vaporizing temperature and pressure conditions, low hydrolysis constant and non-corrosiveness are not preferred. Trioxane is the preferred solvent for use herein; it melts at about 61° C., has a hydrolysis constant of $5.3 \times 10^{-7}$ and is soluble from 21.1 gm./100 cc. of solution at 25° C. to infinity in hot water. At about 115° C. trioxane vaporizes under atmospheric pressure and shows no decomposition at 200° C. for 2 hours. It is not hydrolyzed in neutral or alkaline solution and undergoes only very slow hydrolysis in weak acid solution. Toxicity is very low and recovery from water solution may be effected by further solvent extraction with, for example, ethylene dichloride or methylene chloride, or may be effected by azeotropic distillation either without an added solvent or with a solvent such as hexane which reduces distillation temperature. Azeotropic distillation of solvents from aqueous solution is well known and formulation of appropriate azeotropic systems and distillation conditions will be within the ability of one skilled in the art. Compounds of closed ring structure comprising multiple (—C—O—C—) bonding are preferred for use herein to acyclic ethers because it is believed that hydrogen bonding of water is substantially internally complete within the oxa-cyclic molecule and cross-bonded aggregations of molecules or polymers is avoided.

At atmospheric pressure trioxane crystallizes from aqueous saline solutions obtained from sea water in the manner of this invention at about 48° C., and distills as a constant boiling mixture of about 70 percent trioxane and 30 percent water at about 91° C.; addition of solvent may lower distillation temperature, e.g. with hexane added 70° C. distillation temperature may be achieved. Trioxane does not decompose in vapor phase and may be operably used in the herein described process over a wide range of pressure conditions from sub-atmospheric to 70 atmospheres or more. Mineral salts are soluble in trioxane-water solutions at 48° C. to a maximum for sodium chloride of about 1.6 percent by weight under atmospheric conditions. The method of this invention illustrated in the following examples is applicable over a wide range of conditions of pressure and temperature and is limited substantially only by solubilities of solution components.

Example I 25 ml. Pacific Ocean water obtained near Los Angeles, California, having 3.4 wt. percent total halogen content calculated as NaCl; 60 gms. trioxane.—The above components were placed in a separatory funnel, heated in a water bath to 61° C. and stirred until complete dissolution occurred. The funnel and contents were cooled to 51° C. in the water bath with frequent stirring with the appearance of two phases, the lower phase being 58 ml. in volume and the supernatant phase 19 ml. in volume. The phases were separated at 51° C. after which the lower phase was cooled to below 48° C. with the precipitation of trioxane crystals. An equal volume of ethylene dichloride was added to the lower phase dissolving all trioxane crystals and freeing occluded water which floated on a trioxane-diethylene dichloride rich lower layer. Samples of the floating water layer were removed by pipette and washed with ethylene dichloride to remove residual traces of trioxane after which they were titrated for chloride with 0.1 N $AgNO_3$. The samples obtained analyzed 1.8 wt. percent total halogen calculated as NaCl.

Example II 50 ml. of 3.5 wt. percent solution of NaCl in water; 121 gms. of trioxane.—The above components were placed in a 300 ml. separatory funnel at 61° C. and completely dissolved with stirring into one phase. The total solution volume was 155 ml. The contents of the funnel were cooled in a water bath slowly with frequent stirring and were observed to separate into two liquid phases upon standing. The volumes of the phases were observed: at 57° C. the lower phase was 110 ml.; at 52° C., 100 ml.; and at 48° C. trioxane crystallization occurred. The temperature to the funnel and contents was raised to 57° C. by heating in a water bath with stirring. At 57° C. the lower phase of 110 ml. was removed to a second separatory funnel. A volume of 40 ml. of the remaining upper layer was washed with an equal volume of ethylene dichloride with the appearance of a brine layer floating on a trioxane-ethylene dichloride rich lower layer. The lower layer was removed from the first funnel and the remaining brine layer in the funnel was again washed with ethylene dichloride to remove traces of trioxane. After removing the second ethylene dichloride wash layer, the brine layer remaining, 21 ml. in volume, was titrated with 0.1 N AgNO₃. It was found to contain 4.5 wt. percent NaCl. The temperature of the second funnel was adjusted to 55° C. Two layers appeared. The lower layer was removed and treated as in Example I. The supernatant layer was washed and analyzed in the manner of the supernatant layer of the first funnel. The brine layer 11 ml. in volume formed in the supernatant phase 15 ml. in volume from the second funnel contained 4.0 wt. percent NaCl, and the brine layer 19 ml. in volume formed in the lower phase 95 ml. in volume from the second funnel contained 1.7 wt. percent NaCl as titrated with 0.1 N. AgNO₃.

Example III 50 ml. of 3.5 wt. percent solution of NaCl in water: 120 gms. trioxane.—The precipitative extraction procedure of Example II was followed with additional extractions being made in the described manner of each phase of the second funnel and of the supernatant phase of the first funnel.

| Supernatant phase | Lower phase |
|---|---|
| 1st separation at 61° C.:<br>16 ml. total.<br>8.3 ml. water layer.<br>4.8 wt. percent NaCl in water.<br>2nd separation using supernatant phase 1st separation at 49° C.:<br>12 ml. total.<br>7.5 ml. water layer.<br>5.3 wt. percent NaCl in water<br>2nd separation using lower phase 1st separation 56° C.<br>22 ml. total.<br>15 ml. water layer.<br>4.6 wt. percent NaCl in water. | 1st separation at 61° C.:<br>{137 ml. total.<br>{40 ml. water layer.<br>3.0 wt. percent NaCl in water.<br>2nd separation using supernatant phase 1st separation at 49° C.:<br>4 ml. total.<br>.7 ml. water layer.<br>2.0 wt. percent NaCl in water.<br>2nd separation using lower phase 1st separation at 56° C.:<br>⟵ 115 ml. total.<br>{26 ml. water layer.<br>{2.0 wt. percent NaCl in water. |
| 3rd separation using lower phase 1st separation, supernatant phase 2nd separation at 49° C.:<br>20 ml. total.<br>14 ml. water layer.<br>4.8 wt. percent NaCl. in water. | 3rd separation using lower phase 1st separation, supernatant phase 2nd separation at 49° C.:<br>2 ml. total.<br>.5 ml. water layer.<br>1.8 wt. percent NaCl in water. |
| 3rd separation using lower phase 1st separation, lower phase 2nd separation at 49° C.:<br>10 ml. total.<br>5 ml. water layer.<br>3.8 wt. percent NaCl in water. | 3rd separation using lower phase 1st separation, lower phase 2nd separation at 49° C.:<br>⟶ 105 ml. total.<br>21 ml. water layer.<br>1.6 wt. percent NaCl in water. |

Example IV 25 ml. of 3.5 wt. percent solution of NaCl in water; 60 gms. trioxane.—The above components were placed in a separatory funnel at 54° C. and after stirring and dissolution were observed to separate into a supernatant phase 30 ml. in volume and a lower phase 50 ml. in volume. The procedure of Example II was followed by cooling the funnel and at 51° C. separating a lower phase 49 ml. in volume. Trioxane was extracted from the separate phases by double washing with ethylene dichloride in the manner of Example II to yield water layers 7 ml. in volume with 1.8 wt. percent NaCl in the lower phase and 16 ml. in volume with 4.6 wt. percent NaCl in the supernatant phase.

Example V 35 ml. of 26 wt. percent solution of NaCl in water; 7.5 gms. trioxane.—The above components were placed in a separatory funnel at 55° C. and stirred. A 2 ml. trioxane rich supernatant phase appeared and crystalline salt was observed in the lower phase. Upon cooling to 48° C. crystals of trioxane precipitated. Upon heating the components in a water bath to 64° C. the supernatant trioxane rich phase was reduced to ½ ml. or less while an estimated 1½ ml. of NaCl crystals appeared on the bottom of the funnel. 7½ gms. of trioxane were added and the temperature raised to 68° C. and the contents stirred. After allowing to stand about 2 ml. of NaCl crystals were removed from the bottom of the funnel and were washed with acetone, dried, and found to weigh 1.5 gms.

Example VI 168 gms. of trioxane were placed in a separatory funnel and melted at 62° C. in a water bath.

7 cc. of 3.5 wt. percent solution of NaCl in water were added to the funnel dropwise, the temperature was maintained at about 55° C. Upon the addition of each drop of saline solution salt crystals were observed to precipitate in the funnel. The water appeared to be completely absorbed.

2 cc. of additional 3.5 wt. percent solution of NaCl in water were added with dissolution of all salt crystals in the vessel being observed and with a second liquid phase dispersed as droplets throughout the funnel content appearing. Separation of the disperse phase as a supernatant layer was not effected by standing and the density differential between phases was not sufficient to cause separation of layers until the salt rich phase was more dilute. This extraction method was considered less satisfactory than the addition of solvent to saline solution as in the preceding examples.

Additional extractions of 3.5 wt. percent NaCl solutions in water were separately conducted in the manner and with the proportions of Example II with each of the following solvents replacing sym-trioxane

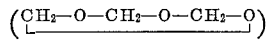

1,3 dioxolane

1,3-dioxolane 2,2 dimethyl;
1,3 dioxolane 2 propyl;
1,3 dioxepane

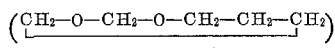

meta-dioxane

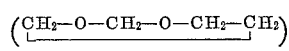

and para-dioxane

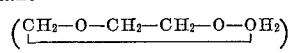

Product water of equivalent saline concentration in any case did not exceed the yield obtained in Example II, and in each extraction the solvent toxicity was equal or greater than that of trioxane in Example II. The stability of each said solvent was less at elevated temperatures and under hydrolyzing conditions than for trioxane, and none is preferred for use in the method disclosed herein.

Precipitation and separation of phases with trioxane conducted as in Example II, but at increasing pressures to 1500 p.s.i. did not materially affect phase volumes, and phase compositions were found to be similar to those of Example II in NaCl content.

The processes of this invention can be performed by continuous multiple extraction methods as will be apparent to one skilled in the art and as described in the literature, e.g. Chemical Engineer's Handbook, McGraw-Hill Book Co., Inc., New York, 1950.

As used herein "oxa-cyclic" means cyclic organic compounds comprising carbon and oxygen as cyclic members, and all other nomenclature is as prescribed in Nomenclature of Organic Chemistry 1957, Butterworth's Scientific Publications, London, 1958, which embodies approved nomenclature of the International Union of Pure and Applied Chemistry.

While certain examples have been described for the purpose of illustrating the invention, it is to be understood that variations will be suggested to persons familiar in the art and that the invention is not limited except by limitations clearly imposed in the appended claims.

I claim:

1. A process for reducing saline content of aqueous solution containing more than about 1.6 percent by weight of mineral salt comprising the steps of:
   (a) introducing into said solution with intimate mixing and at least partial dissolution a quantity of an oxacyclic organic compound having from 3 to 5 carbon atoms and at least 2 oxygen atoms as said cyclic members,
   (b) controlling temperature of said mixture below the temperature of total dissolution to cause formation of plural phases,
   (c) separating said phases,
   (d) removing said compound from at least one of said phases to provide product solution of reduced salinity.

2. The process of claim 1 wherein said organic compound comprises a member selected from the group consisting of dioxepane, trioxane, tetraoxocane, and lower alkyl substituents thereof.

3. The process of claim 1 wherein said compound is removed by azeotropic distillation.

4. The process of claim 1 wherein said compound is removed by solvent extraction.

5. The process of claim 1 wherein one of said phases is a solid phase comprising mineral salt.

6. The process of claim 1 wherein salt-in-water concentration in one of said phases is greater than in said solution.

References Cited

Fieser, L. F., et al., "Organic Chemistry," 3rd ed., p. 200, Reinhold Publishing Corp., New York, 1956.

Harwell, K. E., et al., "Desalination by Liquid-Liquid Extraction," Texas A and M Research Foundation Project 78, reference 54-54T, pp. 6, 11, and 15–16, O.S.W., Dept. of Interior, October 1954.

Hood, D. W., "Exploratory Research on the Applicability of a Solvent Extraction Process," pp. 103–107, third annual report of the Secretary of the Interior on saline water conversion, January 1955.

Horsely, L. H., "Table of Azeotropes and Nonazeotropes," Analysical Chemistry, 19 (8), p. 547 (1947).

Isbell, A. F., et al., "Synthesis of Solvents for Water Desalination: Amines and Ethers," J. Chem. Eng. Data, 1 (4) pp. 575–580 (1962).

Glasstone, S., "Textbook of Physical Chemistry," 2nd ed., pp. 726–727, D. Van Nostrand Co., New York, 1946.

Harwell, K. E. ibid., pp. 1–2.

MORRIS O. WOLK, *Primary Examiner.*

S. MARANTZ, *Assistant Examiner.*

U.S. Cl. X.R.

23—312; 203—70